UNITED STATES PATENT OFFICE.

EDWARD OBERLANDER, HENRY WEISS, AND ERNEST BAGNICKI, OF NEW YORK, N. Y.

IMPROVED COMPOSITION PAINT.

Specification forming part of Letters Patent No. 53,387, dated March 20, 1866.

*To all whom it may concern:*

Be it known that we, EDWARD OBERLANDER, HENRY WEISS, and ERNEST BAGNICKI, of the city, county, and State of New York, have invented a new and useful, as also scentless and economical, Composition Paint for Metal, Stone, Wood, &c.; and we do hereby declare the following is a full description thereof.

This invention relates to a peculiar kind of paint, which, while being put on, as well as when laid on any object, will not emit any smell; will resist atmospheric action; is impervious to water, and dries in thirty minutes after being laid on, when it can be washed with soap and water. It will also present a shining surface, similar to varnish, and is very durable.

The materials used in producing our composition and the process of manufacture we shall describe as follows: First, we prepare what we call "A" or "No. 1" of our composition paint as follows—say to one hundred ounces of water take from eleven to fifteen ounces of shellac and three to five ounces of borax, (more or less,) as the quality of these materials require. These materials are mixed in the following manner: After putting the water in a suitable copper vessel the other ingredients are put in and the vessel placed over a fire, the contents slowly heated, but not boiled, and well stirred all the time until they are all dissolved and well mixed or incorporated, making a homogeneous composition. After this is accomplished we take the vessel from the fire, cover it over, let it cool, and put the composition afterward into bottles, cans, or kegs well sealed or protected from the atmosphere, to remain several days—say from four to six—when it will be fit for use as A No. 1. It will dissolve or mix easier if the several ingredients are in powder, or they be incorporated in a mortar or run through stones or a paint-mill.

The next part of the process, or that of making B or No. 2, is similar; but in this case, instead of the quantity used in No. 1 we take to the one hundred ounces of water—say from twelve to eighteen ounces of shellac, from four to six ounces of borax to one-fourth of gum-arabic and three scruples of white sugar. These are incorporated in the same way as are the ingredients of No. 1, before specified, and varying somewhat in proportion, as the quality of the materials demand—that is, should the quality of any one material be not the best add more of such as is not pure. These ingredients are treated, cooled, and put in close vessels, like No. 1. We now take any dry base or pigment of any desired color and mix it with No. 1 in the ordinary manner of mixing oil-paint, adding a sufficient quantity of the said base as to make a liquid suitable to be laid on with a paint-brush. This will make the first coat and will dry in thirty minutes. We next put on a second coat of the above, or No. 1, and this will also be dry in thirty minutes. Next we take No. 2 alone, and with a clean brush lay the same on for a third coat, which will also dry in about thirty minutes, when the paint thus produced will be of a brilliant color and luster, as if oil or varnish had been used.

Having described the nature and process of manufacture of our invention, we will simply say that it is much cheaper than any other composition paint, for we use no oil, turpentine, or alcohol; use largely of water. Moreover, our composition has the same body and durability as any other good paint. It does not smell, and is, besides, fire-proof. Of course it saves time, labor, and expense in its use.

Having thus described our invention, what we claim as new, and desire to secure by Letters Patent of the United States, is—

As a new article of manufacture, the above-described paint, composed of the materials and quantities substantially as set forth, and prepared in the manner also described.

EDWARD OBERLANDER.
   HENRY WEISS.
   DR. ERNEST BAGNICKI.

Witnesses:
 S. S. FAHNESTOCK,
 L. PAUL JUWET.